United States Patent
Hsu (10) Patent No.: US 11,147,372 B2
(45) Date of Patent: Oct. 19, 2021

(54) MICRO LINEAR SLIDE RAIL ASSEMBLY AND SLIDER THEREOF

(71) Applicant: CHIEFTEK PRECISION CO., LTD., Tainan (TW)

(72) Inventor: Ming-Che Hsu, Tainan (TW)

(73) Assignee: Chieftek Precision Co., Ltd., Tainan (TW)

( * ) Notice: Subject to any disclaimer, the term of this patent is extended or adjusted under 35 U.S.C. 154(b) by 113 days.

(21) Appl. No.: 16/385,187

(22) Filed: Apr. 16, 2019

(65) Prior Publication Data

US 2019/0320795 A1    Oct. 24, 2019

(30) Foreign Application Priority Data

Apr. 23, 2018 (TW) ................................ 107113708

(51) Int. Cl.
*F16C 29/06* (2006.01)
*A47B 88/487* (2017.01)

(52) U.S. Cl.
CPC ........ *A47B 88/487* (2017.01); *F16C 29/0607* (2013.01); *F16C 29/0609* (2013.01);
(Continued)

(58) Field of Classification Search
CPC ........... A47B 88/487; A47B 2210/0032; F16C 29/0607; F16C 29/0609; F16C 29/0611;
(Continued)

(56) References Cited

U.S. PATENT DOCUMENTS 5,092,685 A * 3/1992 Tonogai .............. F16C 29/0607
384/15
5,102,235 A * 4/1992 Mugglestone ...... F16C 29/0609
384/43
(Continued)

FOREIGN PATENT DOCUMENTS

CN    101021231 A    8/2007
EP    0474948 A1    3/1992
(Continued)

OTHER PUBLICATIONS

Communication From the Taiwan Patent Office Regarding a Counterpart Taiwan Application Dated (Taiwan Year 108) dated Mar. 7, 2019.
(Continued)

*Primary Examiner* — Nkeisha Smith
(74) *Attorney, Agent, or Firm* — Rosenberg, Klein & Lee (57) ABSTRACT

A micro linear slide rail assembly and a slider are disclosed. The slider straddles a slide rail. A rolling member is disposed between the slide rail and the slider. The slider is linearly displaced on the slide rail by rolling of the rolling member. The slider includes a main body, a frame coupled to the main body, and two end caps connected to two opposite ends of the main body. The slider has a first unloaded track surface. The first unloaded track surface surrounds an accommodating area. A first engaging portion extends from a lower edge of the accommodating area. The frame has a second unloaded track surface. The frame is mounted to the main body through a second engaging portion to be engaged with the first engaging portion. The first unloaded track surface and the second unloaded track surface are combined to form an unloaded path.

20 Claims, 13 Drawing Sheets

(52) U.S. Cl.
CPC ...... *F16C 29/0611* (2013.01); *F16C 29/0657* (2013.01); *A47B 2210/0032* (2013.01)

(58) Field of Classification Search
CPC .............. F16C 29/0657; F16C 29/0602; F16C 29/0604; F16C 29/0654; F16C 29/06
USPC ................................ 248/430; 384/44, 45, 15
See application file for complete search history.

(56) References Cited

U.S. PATENT DOCUMENTS

| | | | |
|---|---|---|---|
| 6,520,681 B2 * | 2/2003 | Ishihara | F16C 29/0657 384/45 |
| 7,234,867 B2 * | 6/2007 | Ishihara | F16C 29/0609 384/45 |
| 7,241,048 B2 * | 7/2007 | Keller | F16C 29/0602 384/43 |
| 7,465,091 B2 * | 12/2008 | Hsu | F16C 29/0664 384/13 |
| 7,802,921 B2 * | 9/2010 | Wu | F16C 29/065 384/44 |
| 8,220,997 B2 * | 7/2012 | Chen | F16C 29/0657 384/45 |
| 8,998,491 B2 * | 4/2015 | Ishibashi | F16C 29/0607 384/45 |
| 9,297,415 B2 * | 3/2016 | Chu | F16C 29/0611 |
| 9,528,549 B2 * | 12/2016 | Kikuchi | F16C 29/0611 |
| 9,677,610 B2 * | 6/2017 | Chen | F16C 29/0671 |
| 9,709,090 B2 * | 7/2017 | Chen | F16C 29/0633 |
| 9,797,444 B1 * | 10/2017 | Chiu | F16C 29/0609 |
| 9,863,470 B2 * | 1/2018 | Tomita | F16C 29/0607 |
| 9,897,141 B2 * | 2/2018 | Kuwahara | F16C 43/04 |
| 9,995,338 B2 * | 6/2018 | Miyahara | F16C 29/064 |
| 10,174,787 B2 * | 1/2019 | Sakai | F16C 29/0607 |
| 10,550,883 B2 * | 2/2020 | Ishizaki | F16C 29/086 |
| 10,900,518 B2 * | 1/2021 | Lin | F16C 29/0611 |
| 2009/0290820 A1 * | 11/2009 | Hsu | F16C 29/0607 384/45 |
| 2015/0369282 A1 * | 12/2015 | Takahashi | F16C 29/0673 384/44 |
| 2019/0361758 A1 * | 11/2019 | Yamanaka | G06F 11/0736 |
| 2020/0332833 A1 * | 10/2020 | Kishi | F16C 33/585 |

FOREIGN PATENT DOCUMENTS

| | | |
|---|---|---|
| EP | 474948 A1 | 3/1992 |
| EP | 0494682 A2 | 7/1992 |
| JP | 3213363U U | 11/2017 |
| KR | 10-1992-0006661 A | 4/1992 |
| KR | 10-2002-0077017 A | 10/2002 |
| TW | M386401 U1 | 8/2010 |
| TW | I535944 B | 6/2016 |

OTHER PUBLICATIONS

Communication From the Korean Patent Office Regarding a Counterpart Korean Application dated Jun. 8, 2020.
Communication From the Chinese Patent Office Regarding a Counterpart Chinese Application dated Apr. 2, 2020.

* cited by examiner

MICRO LINEAR SLIDE RAIL ASSEMBLY AND SLIDER THEREOF

FIELD OF THE INVENTION

The present invention relates to a micro linear slide rail assembly and a slider thereof, and more particularly to a slider having a frame that is elastically opened to be mounted to a main body in a bottom-up direction. A first engaging portion of the main body is engaged with a second engaging portion of the frame, thereby forming an unloaded path between the frame and the main body. An end cap is mounted between the frame and the main body. A first fixing portion of the frame is coupled to a second fixing portion of the end cap, thereby forming a turning path between the frame and the end cap to communicate with the unloaded path. The main body, the frame and the end caps are combined firmly.

BACKGROUND OF THE INVENTION

A conventional linear slide rail assembly comprises a slide rail, a slider, and a rolling member. The slider of the linear slide rail assembly is slidably moved back and forth on the slide rail through the circular rolling of the rolling member between the slider and the slide rail.

For the rolling member to circulate, in addition to providing a loaded path between the slider and the slide rail, the slider itself provides an unloaded path for the rolling member to circulate back, and the end caps at both ends of the slider provide a turning path communicating with the loaded path and the unloaded path to form a closed circulation path, so that the rolling member can be circulated to drive the slider to move back and forth.

As to the assembly of the slider to provide the unloaded path, please refer to Taiwan Patent No. 1535944 titled "Linear Transmission Device" and European Patent No. EP0474948 titled "Linear Slide Rail Device". In these patents, a slider comprises a main body. The main body has a first unloaded half-track. The first unloaded half-track has an opening for placement of a rolling element. A frame provides a second unloaded half-track. The frame is mounted to the main body, such that the first unloaded half-track and the second unloaded half-track are combined to form an unloaded path. In the above patents, the frame and the main body are assembled and fixed by bolts. However, for a micro slider, because the main body and the frame are small in size, it is difficult to find a stable plane to lock the bolts.

Therefore, for the frame to be mounted to the main body of the micro slider, an alternative solution is required instead of bolts. As disclosed in European Patent No. EP0494682 titled "Linear Motion Device", the frame of this patent is coupled to the main body by means of an engagable structure on each component. However, in this way, the frame has many components, and the shape is complicated. Thus, it is not easy to produce the slider by injection, and the assembly is inconvenient for a microslider.

SUMMARY OF THE INVENTION

In view of the above shortcomings of the prior art, the primary object of the present invention is to provide a micro linear slide rail assembly and a slider thereof. The slider straddles a slide rail. A rolling member is disposed between the slide rail and the slider. The slider is linearly displaced on the slide rail by rolling of the rolling member to constitute the linear slide rail assembly.

The slide rail extends in one direction. The slide rail has a first loaded track surface.

The slider includes a main body, a frame, and two end caps. The main body includes a platform and at least one driving foot extending from the platform for the main body to straddle the slide rail. The driving foot has a second loaded track surface. The first loaded track surface and the second loaded track surface are combined to form a loaded path. The driving foot further has a first unloaded track surface. The first unloaded track surface surrounds an accommodating area. The accommodating area has an opening. The opening has a width substantially equal to a diameter of the rolling member. The opening has an upper edge and a lower edge. The main body has a first engaging portion that extends from the lower edge of the opening and is adjacent to the accommodating area. The frame has a raised track portion and a second engaging portion. The track portion has a second unloaded track surface thereon. The frame is mounted to the main body through the second engaging portion to be engaged with the first engaging portion. The first unloaded track surface and the second unloaded track surface are combined to form an unloaded path. Two end caps are connected to two opposite ends of the main body for providing a turning path communicating with the loaded path and the unloaded path.

Preferably, the first engaging portion is a protruding portion extending laterally, and the second engaging portion is a recess to accommodate the protruding portion. Preferably, the protruding portion is gradually tapered laterally, and the recess is gradually enlarged relative to the protruding portion so as to accommodate the protruding portion.

Preferably, the first engaging portion is fully disposed on the main body in an axial direction of the slide rail, and the second engaging portion is fully disposed on the frame.

Preferably, the frame includes two lower retaining members and two connecting members connected to respective two ends of the two lower retaining members. The two lower retaining members of the frame are elastically opened to be mounted to the main body in a bottom-up direction.

Preferably, the two lower retaining members have a length greater than a length of the main body so that the end caps are mounted between the main body and the connecting members. When the end caps are mounted between the main body and the connecting members, a first fixing portion of the frame is fixed to a second fixing portion of each end cap so that the frame is restrained and cannot be opened again, whereby the main body, the frame and the end caps are combined firmly. Preferably, the first fixing portion of the frame includes an insert pin. The second fixing portion of each end cap includes a receiving groove corresponding to the insert pin. A coupling direction of the insert pin and the receiving groove is perpendicular to an axial direction of the slide rail. The first fixing portion of the frame further includes a hole. The second fixing portion of each end cap further includes a protruding post corresponding to the hole. A coupling direction of the hole and the protruding post is parallel to the axial direction of the slide rail. The first fixing portion of the frame further includes an engaging block. The second fixing portion of each end cap further includes an engaging groove corresponding to the engaging block. A coupling direction of the engaging block and the engaging groove is perpendicular to the axial direction of the slide rail. Preferably, when the end caps are mounted to the frame, an outer turning path surface of each end cap and an inner turning path surface of the insert pin are combined to form the turning path.

Preferably, a lubricating block is disposed on each end cap.

Preferably, the main body has a first stop slope that extends laterally from the upper edge of the opening and is inclined downward. The frame has a second stop slope relative to the first stop slope. When the frame is mounted to the main body, the first stop slope and the second stop slope stop each other.

According to the above technical features, the following effects can be achieved:

1. The frame of the invention is simple in structure and can be produced easily by injection. The frame and the main body are combined through the first engaging portion and the second engaging portion to be engaged with each other, without using bolts for locking, which is beneficial for the miniaturization of the slider and is convenient to be applied to the micro slider.

2. The frame of the invention can be elastically opened to be mounted to the main body in a bottom-up direction. Through the assembly of the end caps, the frame is limited, so that the frame can be restrained and no longer be opened, whereby the main body, the frame and the end caps are combined firmly and won't disengage from the slide rail.

3. The two lower retaining members are connected with the connecting members to constitute the frame. The two lower retaining members of the frame are stretched outwardly for the lower retaining members to avoid the first engaging portion and the first stop slope, so that the frame can be mounted to the main body. In this way, the frame is mounted to the main body easily.

4. The first engaging portion is fully disposed on the main body, and the second engaging portion is fully disposed on the frame. Therefore, when the frame is mounted to the main body, it can have sufficient bonding strength.

5. Through the second engaging portion and the first engaging portion to engage with each other, the frame is restrained in the longitudinal direction. Through the first stop slope and the second stop slope to stop each other, the frame is restrained in the lateral direction. Therefore, during the rolling of the rolling member, the frame is restrained longitudinally and laterally so that the frame won't be loosened and deformed easily.

DETAILED DESCRIPTION OF THE PREFERRED EMBODIMENTS

Embodiments of the present invention will now be described, by way of example only, with reference to the accompanying drawings.

Figure 1:
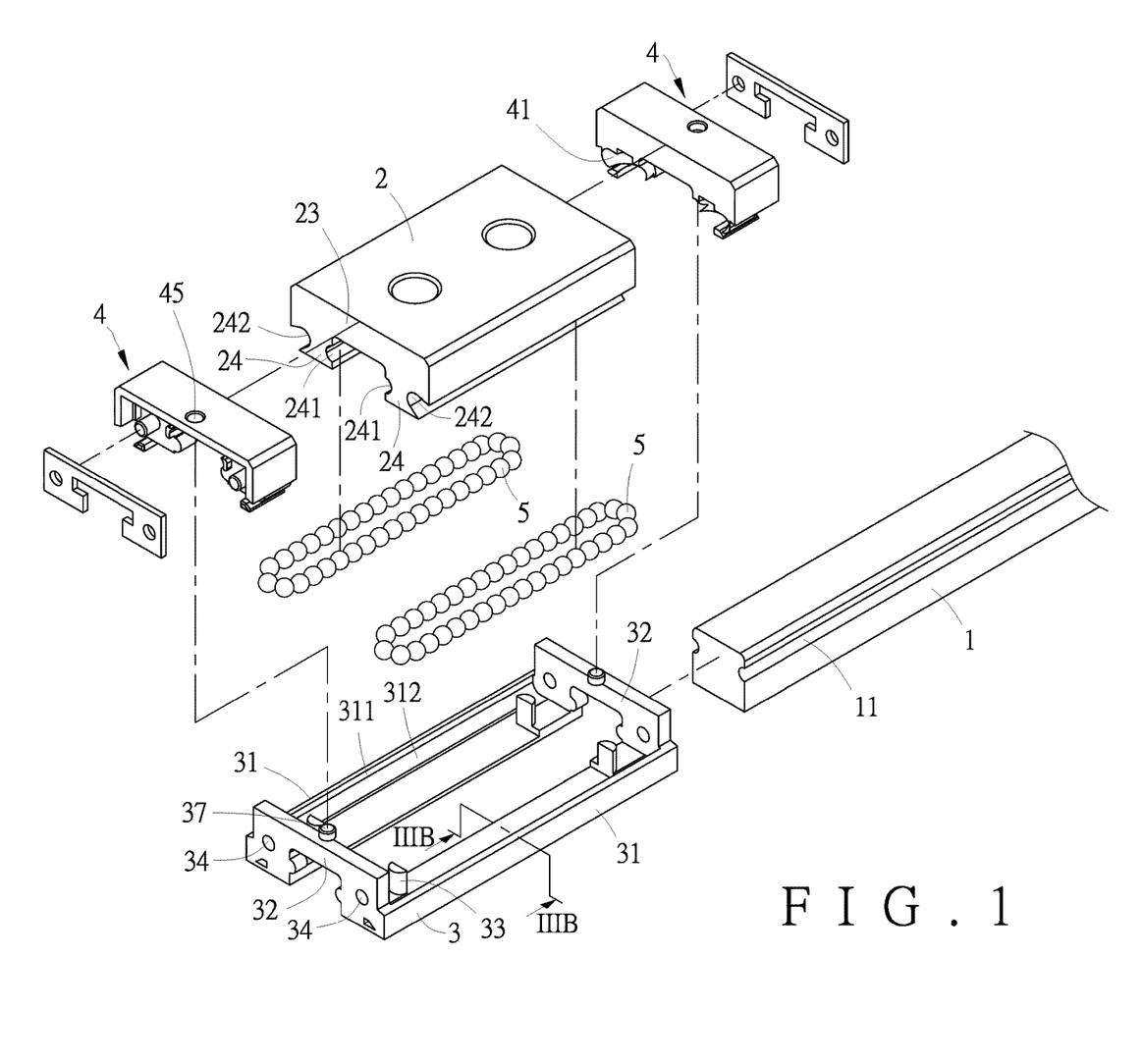
FIG. 1 is an exploded view of the micro linear slide rail assembly of the present invention.
Figure 2:
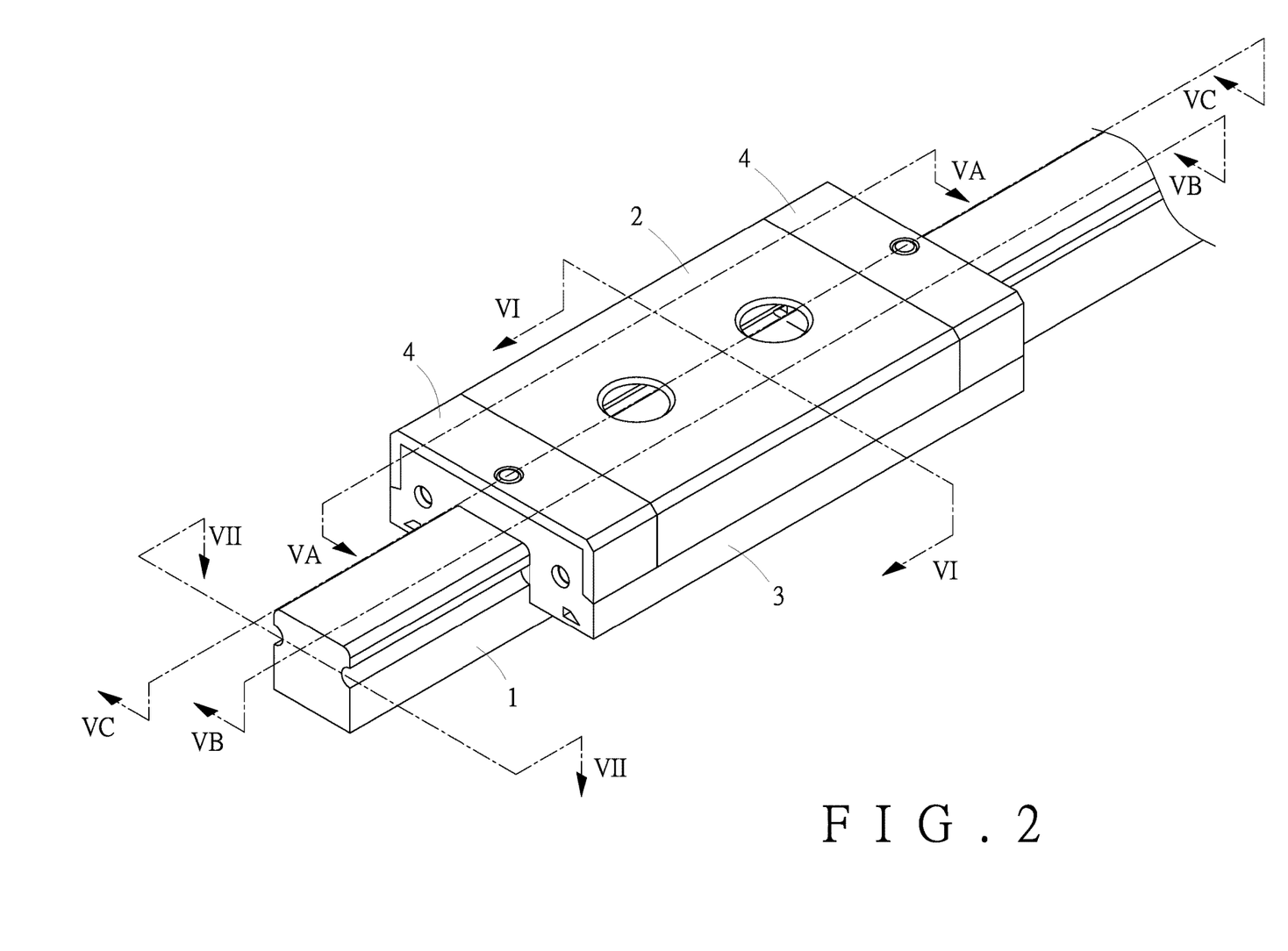
FIG. 2 is a perspective view of the micro linear slide rail assembly of the present invention.

Referring to FIG. 1 and FIG. 2, the embodiment comprises a slide rail (1) and a slider straddling the slide rail (1). The slider includes a main body (2), a frame (3) mounted beneath the main body (2), and two end caps (4) mounted to two ends of the main body (2). A rolling member (5) is disposed between the slide rail (1) and the slider. The slider is linearly displaced on the slide rail (1) by rolling of the rolling member (5).

The slide rail (1) has a length extending in one direction, and the length of the slide rail (1) depends on the place of use. Two opposite sides of the slide rail (1) each have a first loaded track surface (11).

The main body (2) includes a platform (23) and two corresponding driving feet (24) extending downward from the platform (23). The main body (2) is seated on the slide rail (1) through the driving feet (24). Each driving foot (24) has a second loaded track surface (241) and a first unloaded track surface (242) located on two opposite sides thereof. The second loaded track surfaces (241) of the two corresponding driving feet (24) correspond to the first loaded track surfaces (11) on the two opposite sides of the slide rail (1), respectively.

The frame (3) includes two lower retaining members (31) and two connecting members (32) connected to respective two ends of the two lower retaining members (31). The two lower retaining members (31) are connected to be one-piece, so that the two lower retaining members (31) are directly mounted to the main body (2) at a time. Each lower retaining member (31) has a raised track portion (311). The track portion (311) has a second unloaded track surface (312) thereon. The second unloaded track surface (312) corresponds to the first unloaded track surface (242) of the driving foot (24). The frame (3) further has a first fixing portion. The first fixing portion includes an insert pin (33), a hole (34), and an engaging block (37).

Figure 3A:
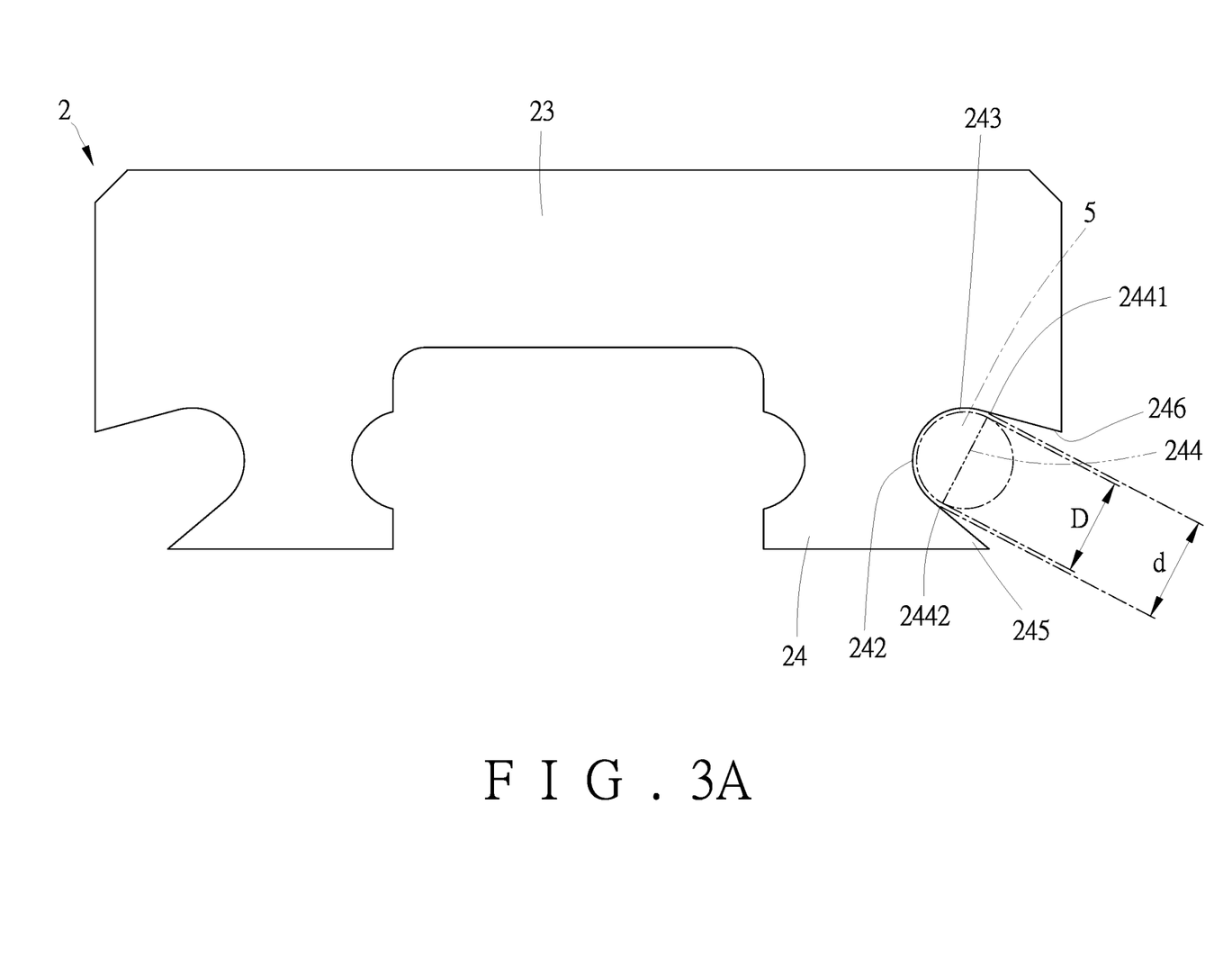
FIG. 3A is a schematic view of the main body of the slider of the present invention.

Referring to FIG. 3A, the first unloaded track surface (242) surrounds an accommodating area (243). The accommodating area (243) has an opening (244). The width (d) of the opening (244) is substantially equal to the diameter (D) of the rolling member (5), that is, when the rolling member (5) is placed in an unloaded path (B) formed by the first unloaded track surface (242) and the second unloaded track surface (312), a micro-gap is defined between the rolling member (5) and the unloaded path (B). The micro-gap allows the rolling element (5) to roll smoothly, but does not cause vibrations of the main body (2). This can be seen in FIG. 6A. The opening (244) has an upper edge (2441) and a lower edge (2442). The main body (2) has a first engaging portion (245) that extends from the lower edge (2442) of the opening (244) and is adjacent to the accommodating area (243). The first engaging portion (245) is a protruding portion extending laterally. The protruding portion is gradually tapered laterally. The main body (2) has a first stop slope (246) that extends laterally from the upper edge (2441) of the opening (244) and is inclined downward.

Figure 3B:
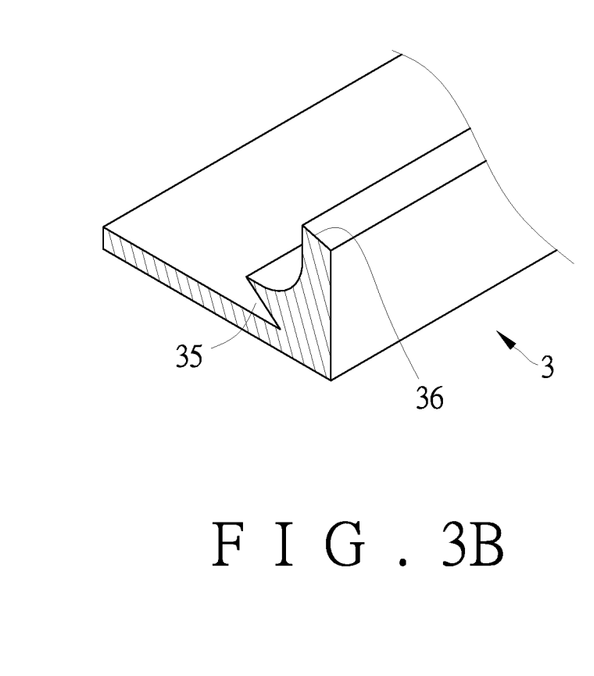
FIG. 3B is a schematic view of the frame of the slider of the present invention.

Referring to FIG. 3B, the frame (3) has a second engaging portion (35) corresponding to the first engaging portion (245). In this embodiment, the second engaging portion (35) is a recess. The recess is gradually enlarged relative to the protruding portion. The frame (3) has a second stop slope (36) relative to the first stop slope (246).

Figure 4A:
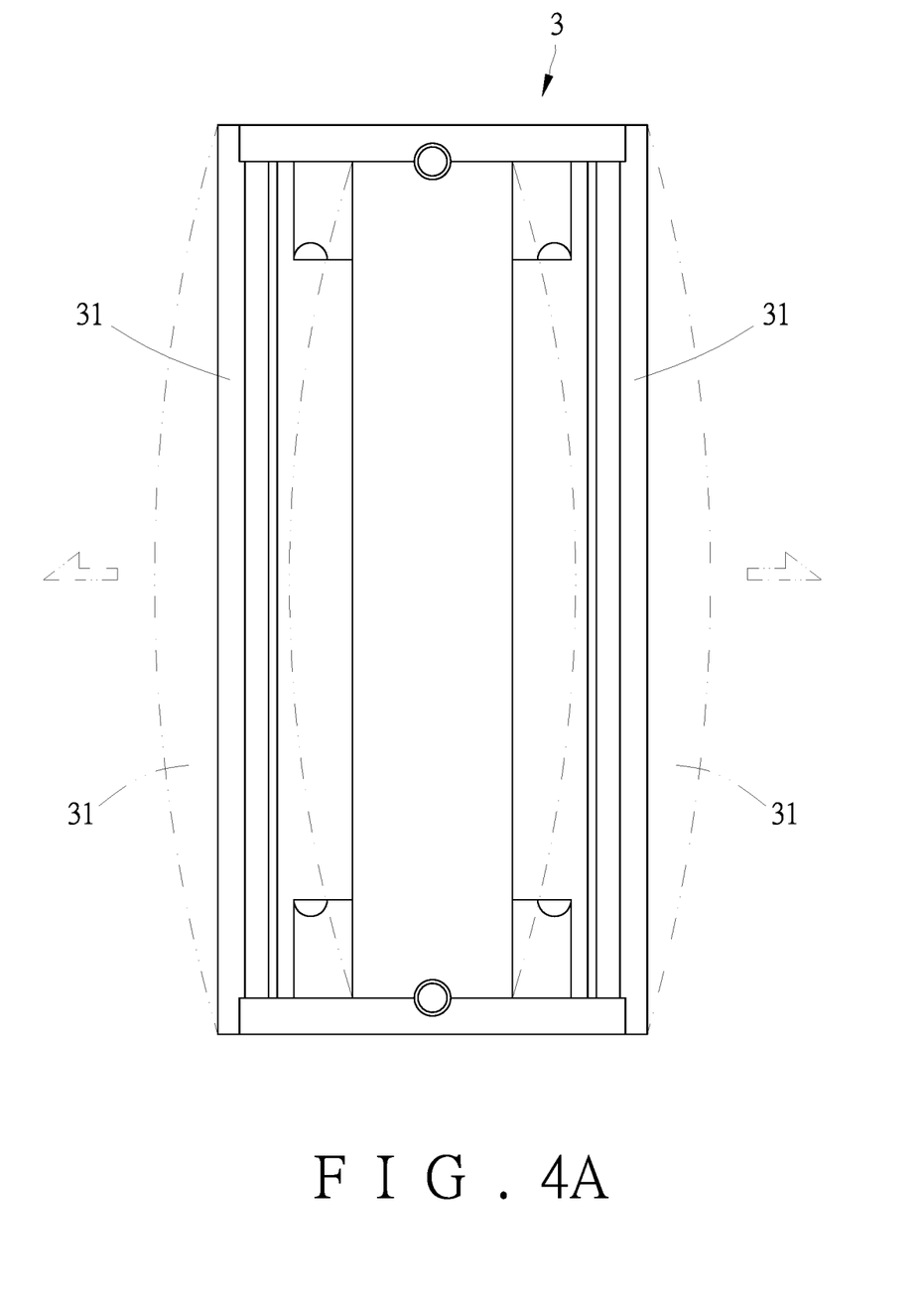
FIG. 4A is a schematic view of the frame of the present invention, showing that the frame is stretched outwardly when the frame is to be mounted to the main body.
Figure 4B:
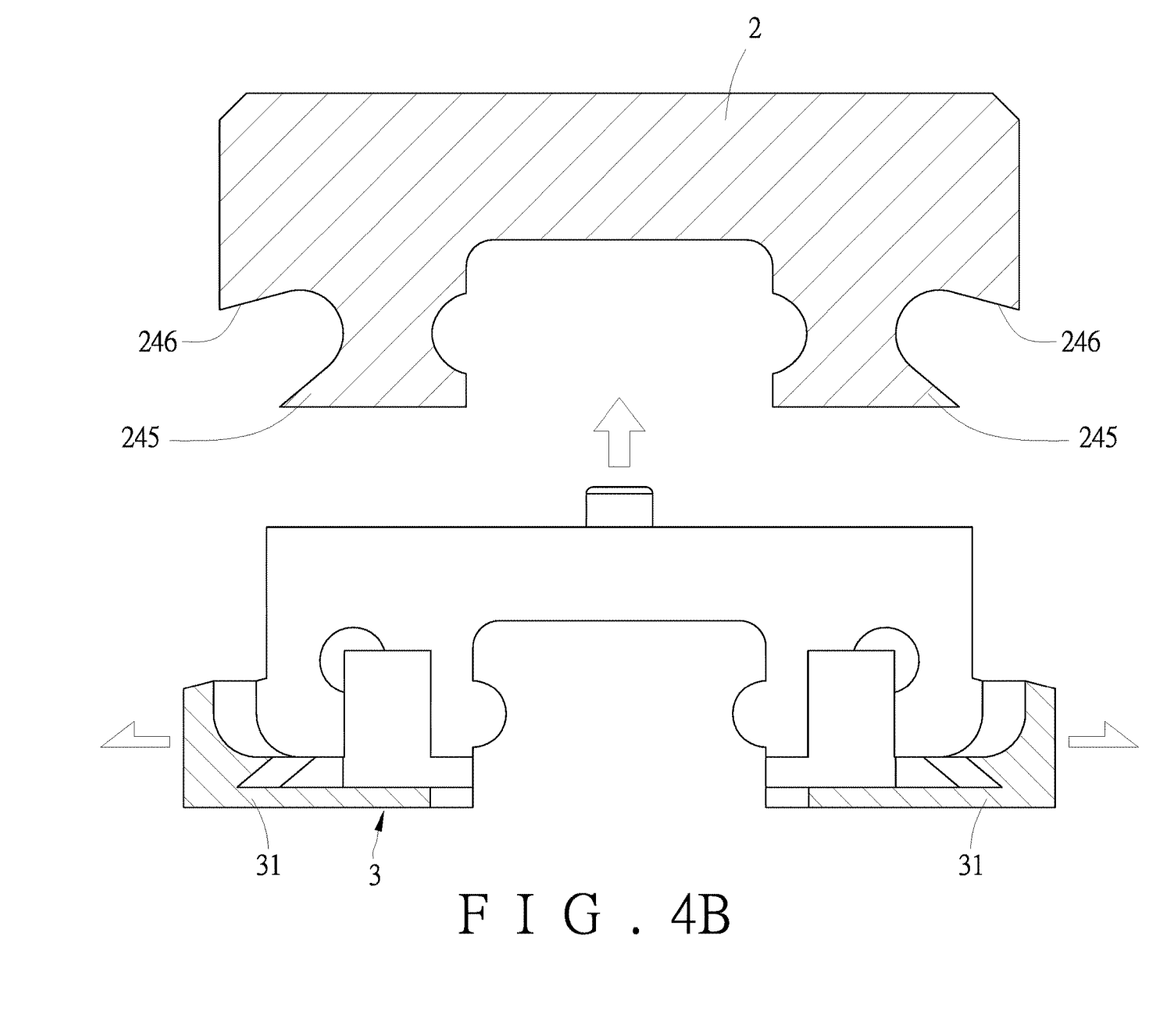
FIG. 4B is a cross-sectional view of the main body and the frame of the present invention, showing that the frame is stretched outwardly when the frame is to be mounted to the main body.

Referring to FIG. 4A and FIG. 4B, when the frame (3) is mounted to the main body (2), the frame (3) will interfere with the first engaging portion (245) of the main body (2) and the first stop slope (246). However, since the frame (3) is generally made of a plastic material, the two lower retaining members (31) of the frame (3) are first stretched outwardly when mounted, such that the lower retaining members (31) can avoid the first engaging portion (245) and the first stop slope (246). Then, after releasing the lower retaining members (31), the frame (3) can be mounted to the main body (2). In this way, the frame (3) can be mounted to the main body (2) easily.

Figure 5A:
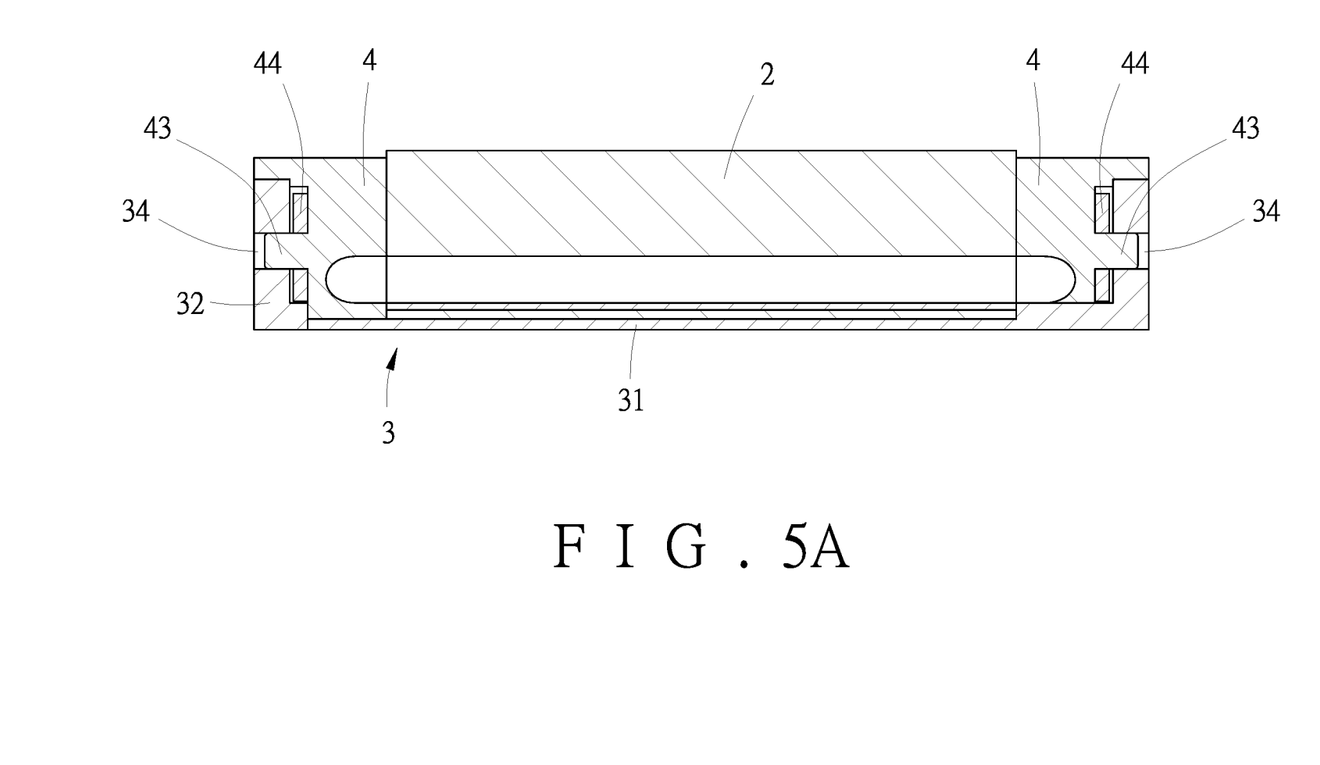
FIG. 5A is a cross-sectional view taken along line VA-VA of FIG. 2.
Figure 5B:
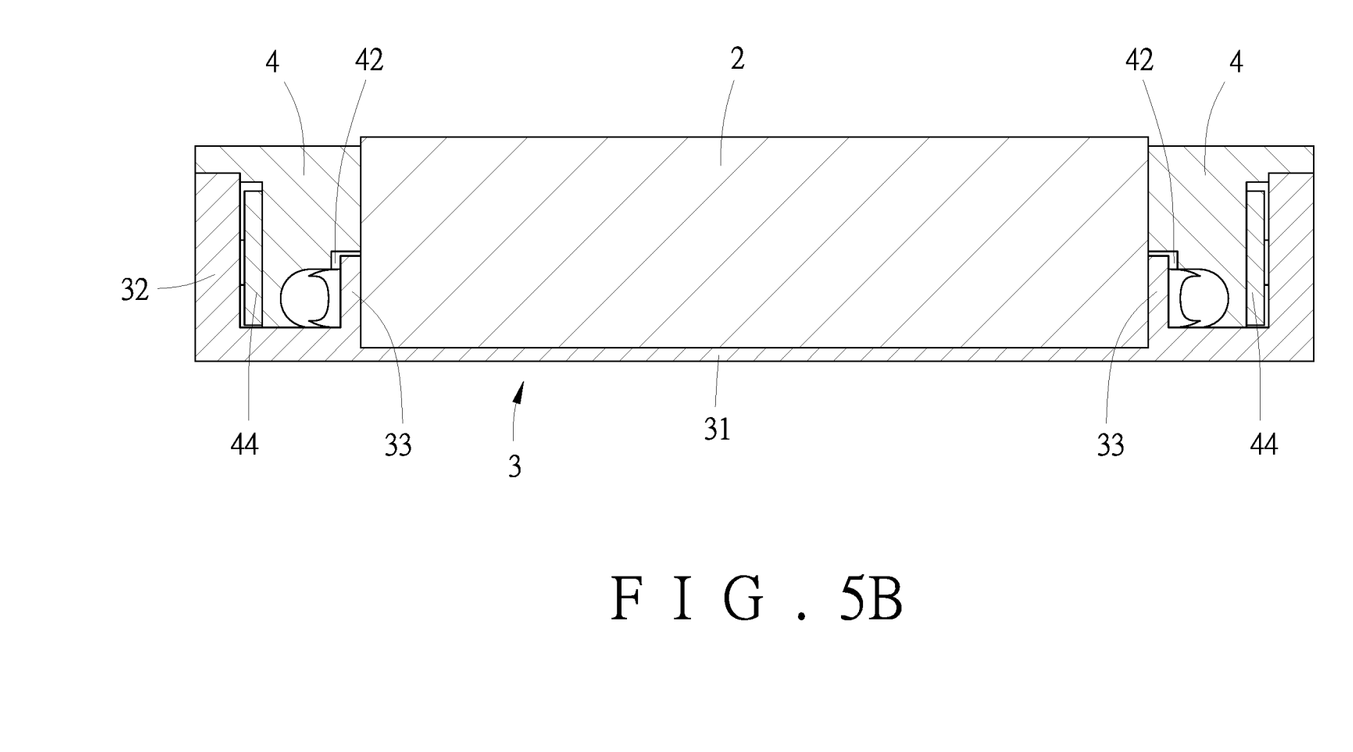
FIG. 5B is a cross-sectional view taken along line VB-VB of FIG. 2.
Figure 5C:
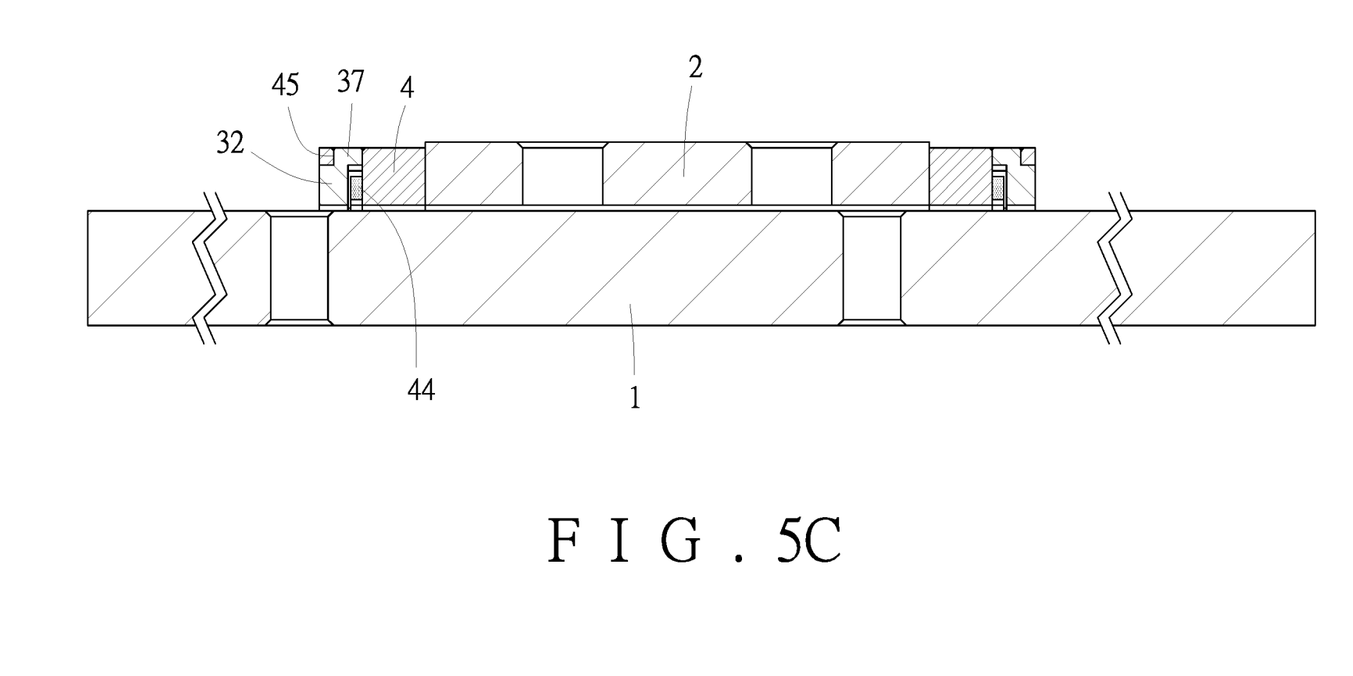
FIG. 5C is a cross-sectional view taken along line VC-VC of FIG. 2.

Referring to FIG. 5A to FIG. 5C, the length of the two lower retaining members (31) is greater than the length of the main body (2), so that the end caps (4) are mounted between the main body (2) and the connecting members (32). When the end caps (4) are mounted between the main body (2) and the connecting members (32), each end cap (4) has a second fixing portion corresponding to the first fixing portion of the frame (3). The second fixing portion includes a receiving groove (42), a protruding post (43), and an engaging groove (45). The insert pin (33) on the frame (3) is fixed in the receiving groove (42) of the corresponding end cap (4). The coupling direction of the insert pin (33) and the receiving groove (42) is perpendicular to the axial direction of the slide rail (1). The protruding post (43) of the end cap (4) is fixed in the hole (34) of the frame (3). The coupling direction of the hole (34) and the protruding post (43) is parallel to the axial direction of the slide rail (1). The engaging block (37) of the frame (3) is fixed in the engaging groove (45) of the end cap (4). The coupling direction of the engaging block (37) and the engaging groove (45) is perpendicular to the axial direction of the slide rail (1). In this way, in addition to the fact that the end caps (4) are firmly fixed to the two ends of the main body (2), the frame (3) is fixed so that the frame (3) can be restrained and no longer be opened. Furthermore, each end cap (4) has a lubricating block (44) for providing a lubricating effect when the main body (2) is running on the slide rail (1).

Figure 6A:
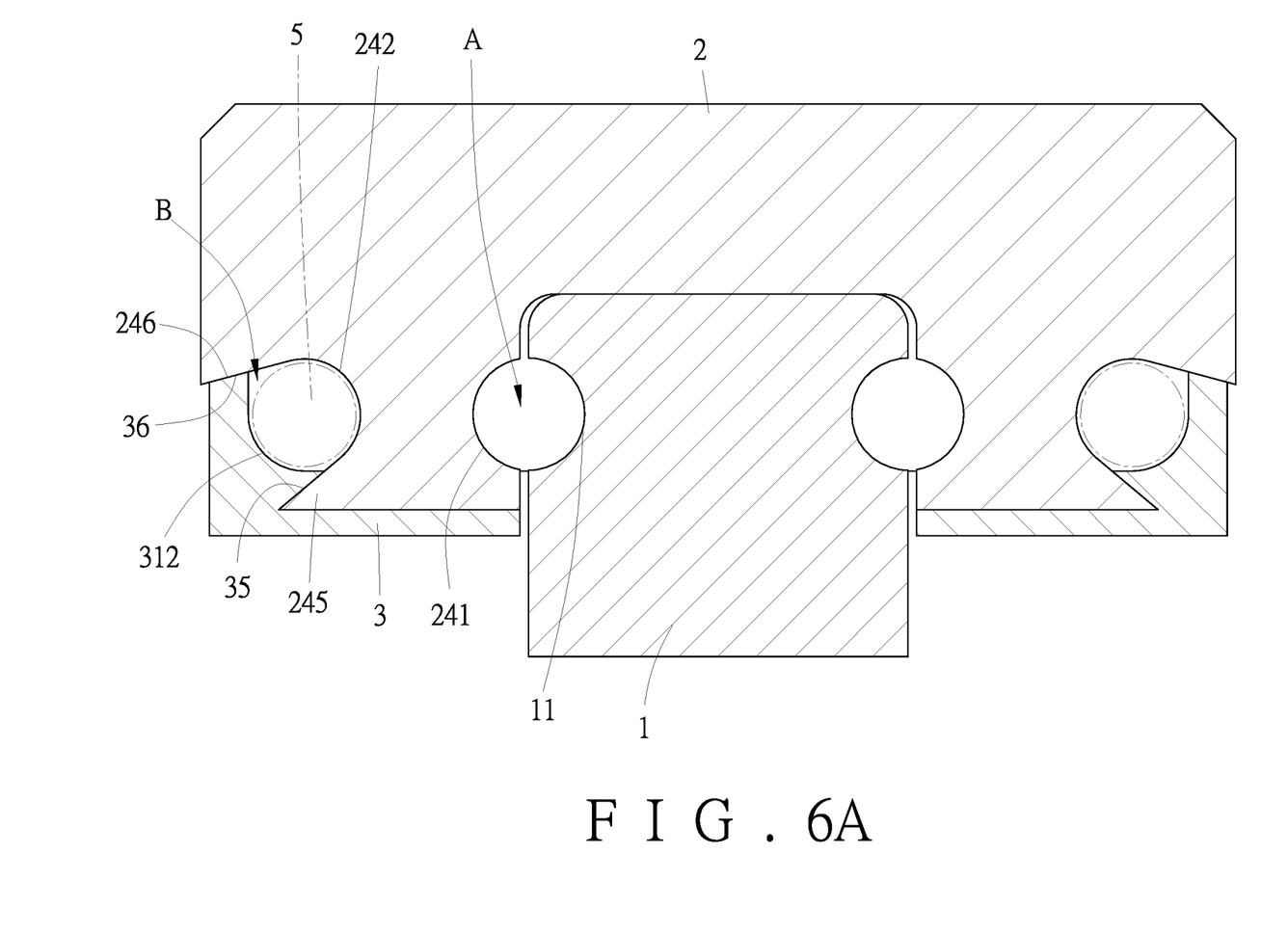
FIG. 6A is a cross-sectional view taken along line VI-VI of FIG. 2.
Figure 6B:
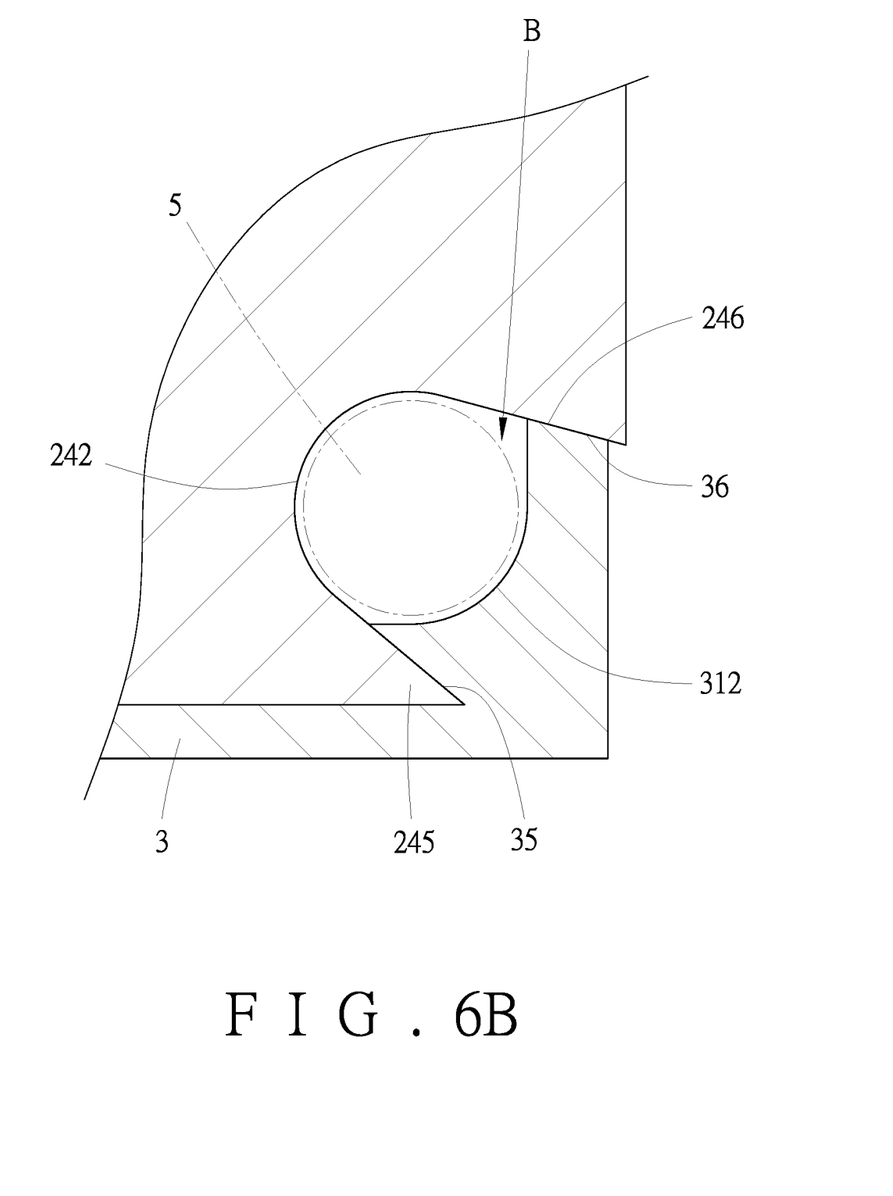
FIG. 6B is a partial enlarged view of circle A of FIG. 6.

Referring to FIG. 6A and FIG. 6B, when the frame (3) is mounted to the main body (2), the second engaging portion (35) of the frame (3) is engaged with the first engaging portion (245) of the main body (2), and the first stop slope (246) and the second stop slope (36) stop each other. Preferably, the first engaging portion (245) is fully disposed on the main body (2) in the axial direction of the slide rail (1), and the second engaging portion (35) is fully disposed on the frame (3), such that the frame (3) and the main body (2) can be combined in full length to improve the bonding strength. Therefore, in addition to the first fixing portion of the frame (3) coupled to the second fixing portion of the end cap (4), the second engaging portion (35) is engaged with the first engaging portion (245) so that the frame (3) is restrained in the longitudinal direction. Through the first stop slope (246) and the second stop slope (36) to stop each other, the frame (3) is restrained in the lateral direction. Therefore, during the rolling of the rolling member (5), because the end portions of the frame (3) are coupled and fixed to the end caps (4), and the main body (2) and the frame (3) are restrained longitudinally and laterally, so that the main body (2), the frame (3) and the end caps(4) are combined firmly, without being loosened and deformed. (As to the combination of the end caps(4) and the frame (3), please refer to FIG. 5A to FIG. 5C).

Figure 7:
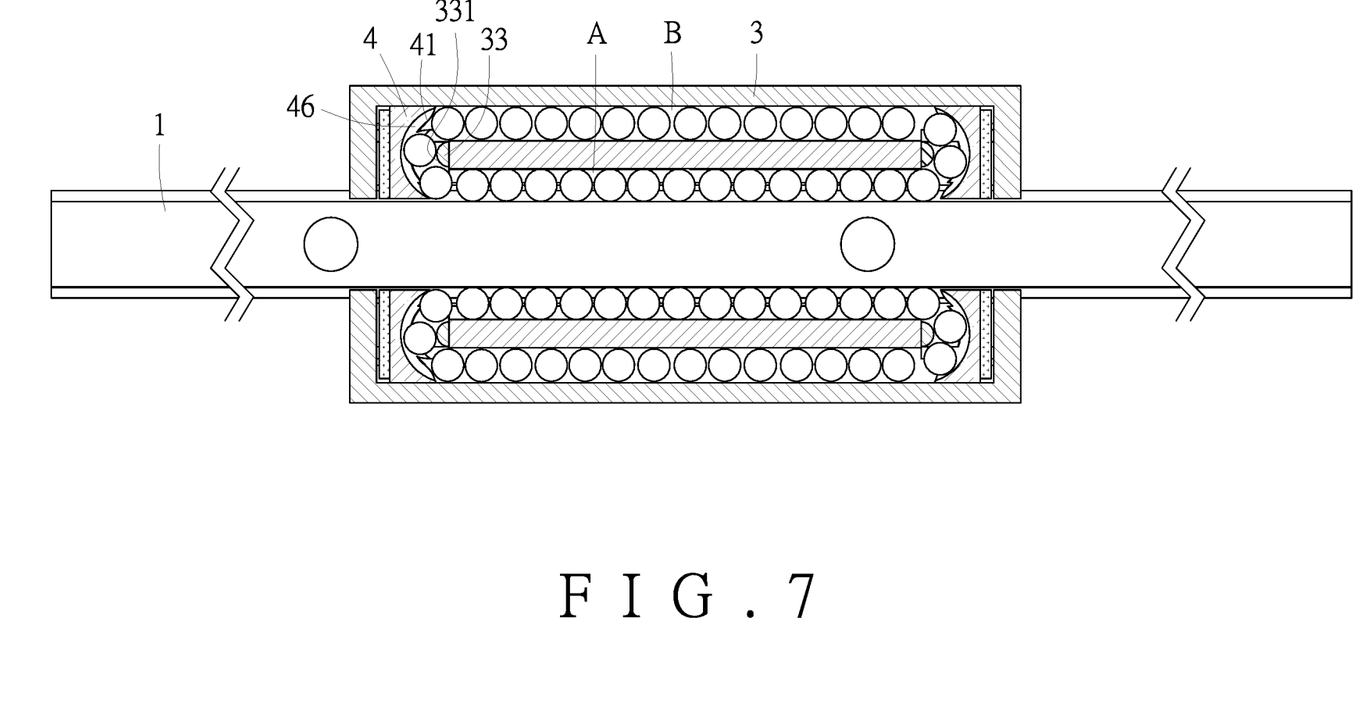
FIG. 7 is a cross-sectional view taken along line VII-VII of FIG. 2.

Referring to FIG. 7, the first loaded track surface (11) of the slide rail (1) and the second loaded track surface (241) of the main body (2) are combined to form a loaded path (A). The first unloaded track surface (242) of the main body (2) and the second unloaded track surface (312) of the frame (3) are combined to form an unloaded path (B). (As to the combination of the loaded path (A) as well as the unloaded path (B), please refer to FIG. 6A and FIG. 6B.) The end caps (4) cover the two ends of the main body (2), so that a turning path (41) of the end caps (4) is in communication with the loaded path (A) and the unloaded path (B) to form a circulation path. It should be noted that when the end cap (4) is mounted to the frame (3), an outer turning path surface (46) of the end cap (4) and an inner turning path surface (331) of the insert pin (33) are combined to form the turning path (41).

Figure 8:
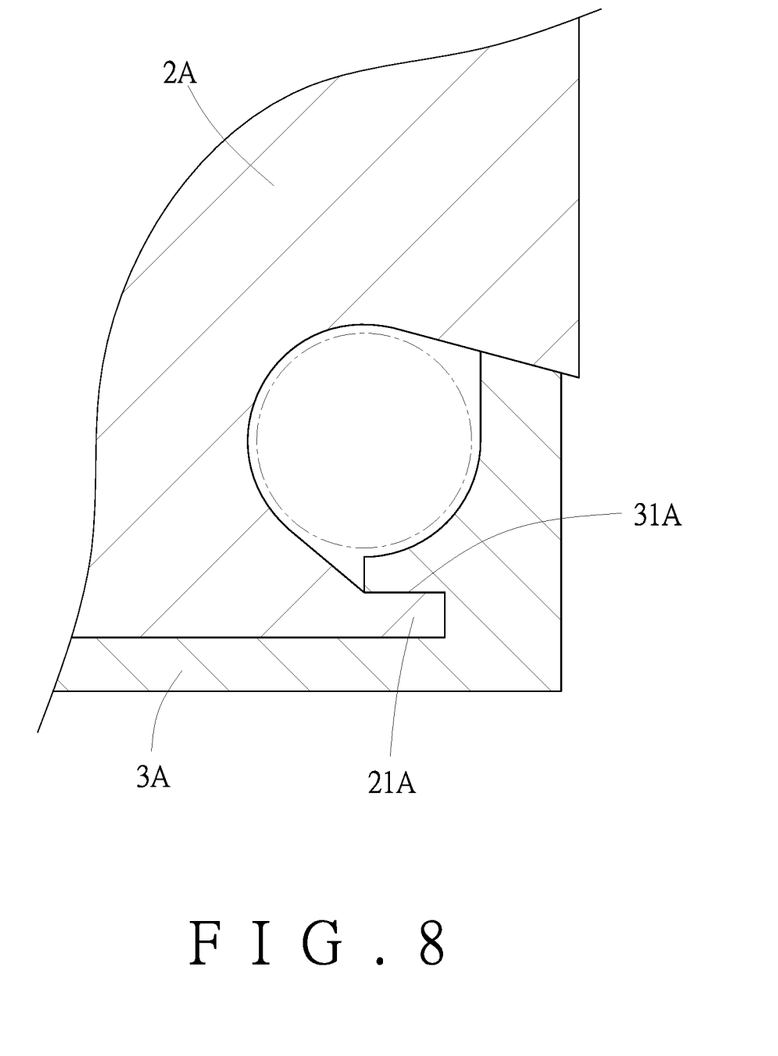
FIG. 8 is a schematic view showing another configuration of the frame of the present invention.

FIG. 8 illustrates another configuration of the first engaging portion of the main body and the second engaging portion of the frame. In this figure, the reference number of the main body is 2A, the reference number of the first engaging portion is 21A, the reference number of the frame is 3A, and the reference number of the second engaging portion is 31A. The first engaging portion (21A) of the main body (2A) is a horizontal protruding portion extending laterally, and the second engaging portion (31A) of the frame (3) is a horizontal recess to accommodate the horizontal protruding portion. It should be noted that no matter what kind of configuration of the first engaging portion and the second engaging portion, as long as the main body and the frame can be engaged with each other, it is within the scope of protection of the present invention.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A slider for a micro linear slide rail assembly, the slider being configured to straddle a slide rail and to be linearly displaceable on the slide rail by rolling of a rolling member, the slider comprising:

a main body, including a platform and at least one driving foot extending from the platform to enable the main body to straddle the slide rail, the driving foot having a second loaded track surface configured to combine with a first loaded track surface of the slide rail to form a loaded path, the driving foot further having a first unloaded track surface, the first unloaded track surface surrounding an accommodating area, the accommodating area having an opening, the opening having a width substantially equal to a diameter of the rolling member, the opening having an upper edge and a lower edge, the main body having a first engaging portion that extends from the lower edge of the opening and is adjacent to the accommodating area;

a frame, having a raised track portion and a second engaging portion, the track portion having a second unloaded track surface thereon, the frame being mounted to the main body through the second engaging portion to be engaged with the first engaging portion, the first unloaded track surface and the second unloaded track surface being combined to form an unloaded path, the second engaging portion and a top of the track portion respectively extending from opposite edges of the second unloaded track surface; and two end caps, connected to two opposite ends of the main body and configured to provide a turning path for communicating with the loaded path and the unloaded path, wherein the second engaging portion is engaged with the first engaging portion and the top of the track portion is engaged against the upper edge of the opening, the frame being thereby restrained against the main body unassisted by the end caps.

2. The slider as claimed in claim 1, wherein the frame includes two lower retaining members and two connecting members connected to respective two ends of the two lower retaining members, and the two lower retaining members of the frame are elastically opened to be mounted to the main body in a bottom-up direction.

3. The slider as claimed in claim 1, wherein the first engaging portion is a protruding portion extending laterally, and the second engaging portion is a recess to accommodate the protruding portion.

4. The slider as claimed in claim 3, wherein the protruding portion is gradually tapered laterally, and the recess is gradually enlarged relative to the protruding portion so as to accommodate the protruding portion.

5. The slider as claimed in claim 1, wherein the first engaging portion is fully disposed on the main body in an axial direction of the slide rail, and the second engaging portion is fully disposed on the frame.

6. The slider as claimed in claim 1, wherein:
the main body has a first stop slope that extends laterally from the upper edge of the opening and is inclined downward;
the frame has a second stop slope relative to the first stop slope; and
when the frame is mounted to the main body, the first stop slope and the second stop slope stop each other.

7. The slider as claimed in claim 1, wherein a lubricating block is disposed on each end cap.

8. A slider for a micro linear slide rail assembly, the slider being configured to straddle a slide rail and to be linearly displaceable on the slide rail by rolling of a rolling member, the slider comprising:
a main body, including a platform and at least one driving foot extending from the platform to enable the main body to straddle the slide rail, the driving foot having a second loaded track surface configured to combine with a first loaded track surface of the slide rail to form a loaded path, the driving foot further having a first unloaded track surface, the first unloaded track surface surrounding an accommodating area, the accommodating area having an opening, the opening having a width substantially equal to a diameter of the rolling member, the opening having an upper edge and a lower edge, the main body having a first engaging portion that extends from the lower edge of the opening and is adjacent to the accommodating area;
a frame, including a raised track portion, a second engaging portion, two lower retaining members, and two connecting members connected to respective two ends of the two lower retaining members, the track portion having a second unloaded track surface thereon, the frame being mounted to the main body through the second engaging portion to be engaged with the first engaging portion, the first unloaded track surface and the second unloaded track surface being combined to form an unloaded path, the two lower retaining members of the frame being elastically opened to be mounted to the main body in a bottom-up direction; and two end caps, connected to two opposite ends of the main body and configured to provide a turning path for communicating with the loaded path and the unloaded path, wherein the two lower retaining members have a length greater than a length of the main body, the end caps being thereby mounted between the main body and the connecting members, and wherein, when the end caps are mounted between the main body and the connecting members, a first fixing portion of the frame is fixed to a second fixing portion of each end cap, the frame being thereby restrained and prevented from reopening, whereby the main body, the frame and the end caps are combined firmly.

9. The slider as claimed in claim 8, wherein:
the first fixing portion of the frame includes an insert pin, the second fixing portion of each end cap includes a receiving groove corresponding to the insert pin, and a coupling direction of the insert pin and the receiving groove is perpendicular to an axial direction of the slide rail;
the first fixing portion of the frame further includes a hole, the second fixing portion of each end cap further includes a protruding post corresponding to the hole, and a coupling direction of the hole and the protruding post is parallel to the axial direction of the slide rail; and
the first fixing portion of the frame further includes an engaging block, the second fixing portion of each end cap further includes an engaging groove corresponding to the engaging block, and a coupling direction of the engaging block and the engaging groove is perpendicular to the axial direction of the slide rail.

10. The slider as claimed in claim 9, wherein when the end caps are mounted to the frame, an outer turning path surface of each end cap and an inner turning path surface of the insert pin are combined to form the turning path.

11. A micro linear slide rail assembly, comprising a slide rail, a slider straddling the slide rail, and a rolling member disposed between the slide rail and the slider, the slider being linearly displaced on the slide rail by rolling of the rolling member, the slide rail extending in one direction, the slide rail having a first loaded track surface,
wherein the slider includes:
a main body, including a platform and at least one driving foot extending from the platform for the main body to straddle the slide rail, the driving foot having a second loaded track surface, the second loaded track surface being combined with the first loaded track surface of the slide rail to form a loaded path, the driving foot further having a first unloaded track surface, the first unloaded track surface surrounding an accommodating area, the accommodating area having an opening, the opening having a width substantially equal to a diameter of the rolling member, the opening having an upper edge and a lower edge, the main body having a first engaging portion that extends from the lower edge of the opening and is adjacent to the accommodating area,
a frame, having a raised track portion and a second engaging portion, the track portion having a second unloaded track surface thereon, the frame being mounted to the main body through the second engaging portion to be engaged with the first engaging portion, the first unloaded track surface and the second unloaded track surface being combined to form an unloaded path, the second engaging portion and a top of the track portion respectively extending from opposite edges of the second unloaded track surface, and two end caps, connected to two opposite ends of the main body and providing a turning path for communicating with the loaded path and the unloaded path, and wherein the second engaging portion is engaged with the first engaging portion and the top of the track portion is engaged against the upper edge of the opening, the frame being thereby restrained against the main body unassisted by the end caps.

12. The micro linear slide rail assembly as claimed in claim 11, wherein the frame includes two lower retaining members and two connecting members connected to respective two ends of the two lower retaining members, and the two lower retaining members of the frame are elastically opened to be mounted to the main body in a bottom-up direction.

13. The micro linear slide rail assembly as claimed in claim 12, wherein:

the two lower retaining members have a length greater than a length of the main body, the end caps being thereby mounted between the main body and the connecting members, and when the end caps are mounted between the main body and the connecting members, a first fixing portion of the frame is fixed to a second fixing portion of each end cap, the frame being thereby restrained and prevented from reopening, whereby the main body, the frame and the end caps are combined firmly.

14. The micro linear slide rail assembly as claimed in claim 13, wherein:

the first fixing portion of the frame includes an insert pin, the second fixing portion of each end cap includes a receiving groove corresponding to the insert pin, and a coupling direction of the insert pin and the receiving groove is perpendicular to an axial direction of the slide rail;

the first fixing portion of the frame further includes a hole, the second fixing portion of each end cap further includes a protruding post corresponding to the hole, and a coupling direction of the hole and the protruding post is parallel to the axial direction of the slide rail; and the first fixing portion of the frame further includes an engaging block, the second fixing portion of each end cap further includes an engaging groove corresponding to the engaging block, and a coupling direction of the engaging block and the engaging groove is perpendicular to the axial direction of the slide rail.

15. The micro linear slide rail assembly as claimed in claim 14, wherein when the end caps are mounted to the frame, an outer turning path surface of each end cap and an inner turning path surface of the insert pin are combined to form the turning path.

16. The micro linear slide rail assembly as claimed in claim 11, wherein the first engaging portion is a protruding portion extending laterally, and the second engaging portion is a recess to accommodate the protruding portion.

17. The micro linear slide rail assembly as claimed in claim 16, wherein the protruding portion is gradually tapered laterally, and the recess is gradually enlarged relative to the protruding portion so as to accommodate the protruding portion.

18. The micro linear slide rail assembly as claimed in claim 11, wherein the first engaging portion is fully disposed on the main body in an axial direction of the slide rail, and the second engaging portion is fully disposed on the frame.

19. The micro linear slide rail assembly as claimed in claim 11, wherein:

the main body has a first stop slope that extends laterally from the upper edge of the opening and is inclined downward;

the frame has a second stop slope relative to the first stop slope; and when the frame is mounted to the main body, the first stop slope and the second stop slope stop each other.

20. The micro linear slide rail assembly as claimed in claim 11, wherein a lubricating block is disposed on each end cap.

* * * * *